(12) United States Patent
Laroia et al.

(10) Patent No.: US 7,023,928 B2
(45) Date of Patent: Apr. 4, 2006

(54) SYNCHRONIZATION OF A PILOT ASSISTED CHANNEL ESTIMATION ORTHOGONAL FREQUENCY DIVISION MULTIPLEXING SYSTEM

(75) Inventors: Rajiv Laroia, Basking Ridge, NJ (US); Junyi Li, Bedminster, NJ (US); Sundeep Rangan, Hoboken, NJ (US); Hemanth T. Sampath, Bethesda, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 962 days.

(21) Appl. No.: 09/922,885

(22) Filed: Aug. 6, 2001

(65) Prior Publication Data

US 2003/0026371 A1 Feb. 6, 2003

(51) Int. Cl.
*H04K 1/10* (2006.01)
(52) U.S. Cl. .................. 375/260; 375/344; 370/210
(58) Field of Classification Search ............... 375/147, 375/149, 219, 222, 260, 344, 362; 370/206, 370/208, 210
See application file for complete search history.

(56) References Cited

U.S. PATENT DOCUMENTS

| | | | | |
|---|---|---|---|---|
| 5,640,431 A | * | 6/1997 | Bruckert et al. ............ 375/344 |
| 5,930,305 A | * | 7/1999 | Leib .......................... 375/324 |
| 6,546,056 B1 | * | 4/2003 | Rosenlof ..................... 375/260 |
| 6,549,583 B1 | * | 4/2003 | Crawford .................... 375/260 |
| 6,891,792 B1 | * | 5/2005 | Cimini et al. ............... 370/206 |
| 2003/0058952 A1 | * | 3/2003 | Webster et al. ............. 375/260 |
| 2004/0105512 A1 | * | 6/2004 | Priotti ........................ 375/340 |

* cited by examiner

*Primary Examiner*—Young T. Tse

(57) ABSTRACT

A synchronization of a pilot assisted channel estimation orthogonal frequency division multiplexing can be achieved by receiving a signal containing pilot symbols, providing an initial time and frequency synchronization to the signal, phase rotating the signal across time, transforming the signal with a fast Fourier transformation, phase rotating the signal across frequency, extracting the pilot symbols and generating a channel estimator. The phase rotating across time and the phase rotating across frequency are controlled by a phase rotation controller in accordance with the channel estimator. The initial time and frequency synchronization synchronizes the signal such that intercarrier interference effects and intersymbol interference effects are negligible. The signal may include plural carrier frequencies each having an arrival timing offset and a frequency offset. The signal may also include delay spread or Doppler spread. The phase rotation controller measures a phase different between the channel estimator at times k and k+$\Delta$k, where k is time and $\Delta$k is a symbol period and measures a phase difference between the channel estimator at frequencies n and n+$\Delta$n, where n is tone frequency and $\Delta$n is a frequency spacing between adjacent tones.

30 Claims, 6 Drawing Sheets

SYNCHRONIZATION OF A PILOT ASSISTED CHANNEL ESTIMATION ORTHOGONAL FREQUENCY DIVISION MULTIPLEXING SYSTEM

FIELD OF THE INVENTION

The present invention relates generally to synchronization for orthogonal frequency division multiplexing (OFDM), and more particularly to time-frequency compensated synchronization for pilot assisted channel estimation OFDM communication systems.

BACKGROUND

A pilot assisted channel estimation OFDM system has a transmitter that sends predetermined pilot symbols in a set of dedicated time and frequency pilot points for receipt by a receiver. The receiver uses the pilot symbols to help decode the signal. The pilot assisted channel estimation OFDM is sensitive to time and frequency synchronization errors that cause baseband phase rotations in the channel. The phase rotations reduce channel time and frequency coherence, thereby increasing the interpolation error of pilot assisted channel estimations. The interpolation error can dramatically degrade the channel estimation of a single path channel system and is even more pronounced in multiple path channel systems.

Various methods are presently used to synchronize and reduce the interpolation error in OFDM systems including blind algorithms and wideband synchronization pilot signals transmitted intermittently in short time periods. The blind algorithms use a cyclical prefix instead of the pilot symbols to synchronize the OFDM system. The wideband synchronization pilot signals use an additional intermittent pilot signal to synchronize the OFDM system. The additional intermittent pilot symbol increases the pilot symbol overhead and is incapable of tracking any fast time variations in the channel. These methods when applied to multipath systems simply assume there is a single time and frequency offset to be estimated and do not directly consider multipath effects. These systems cannot synchronize to all of the channels simultaneously since each channel can have a different arrival time and frequency offset. Furthermore, these cannot adequately process signals having a delay or a Doppler spread.

SUMMARY OF THE INVENTION

We have recognized that OFDM systems have a major problem in that implementations using pilot-assisted coherent modulation are highly sensitive to time and frequency errors. To overcome this problem, a synchronization method for coherent OFDM systems with pilot-assisted linear channel estimation has been invented. In accordance with the principles of the invention, the receiver estimates the average channel estimation error by comparing the measured and estimated values of the channel gain on the time-frequency pilot points. The receiver then fine tunes its timing and frequency to minimize the estimated channel error. The minimization can be conducted in real-time using an initial coarse discrete minimization followed by a simple stochastic gradient tracking loop. This is well-suited to channels with both frequency and time dispersion and does not require any pilot data in addition to the channel estimation pilots.

DETAILED DESCRIPTION

Figure 1:
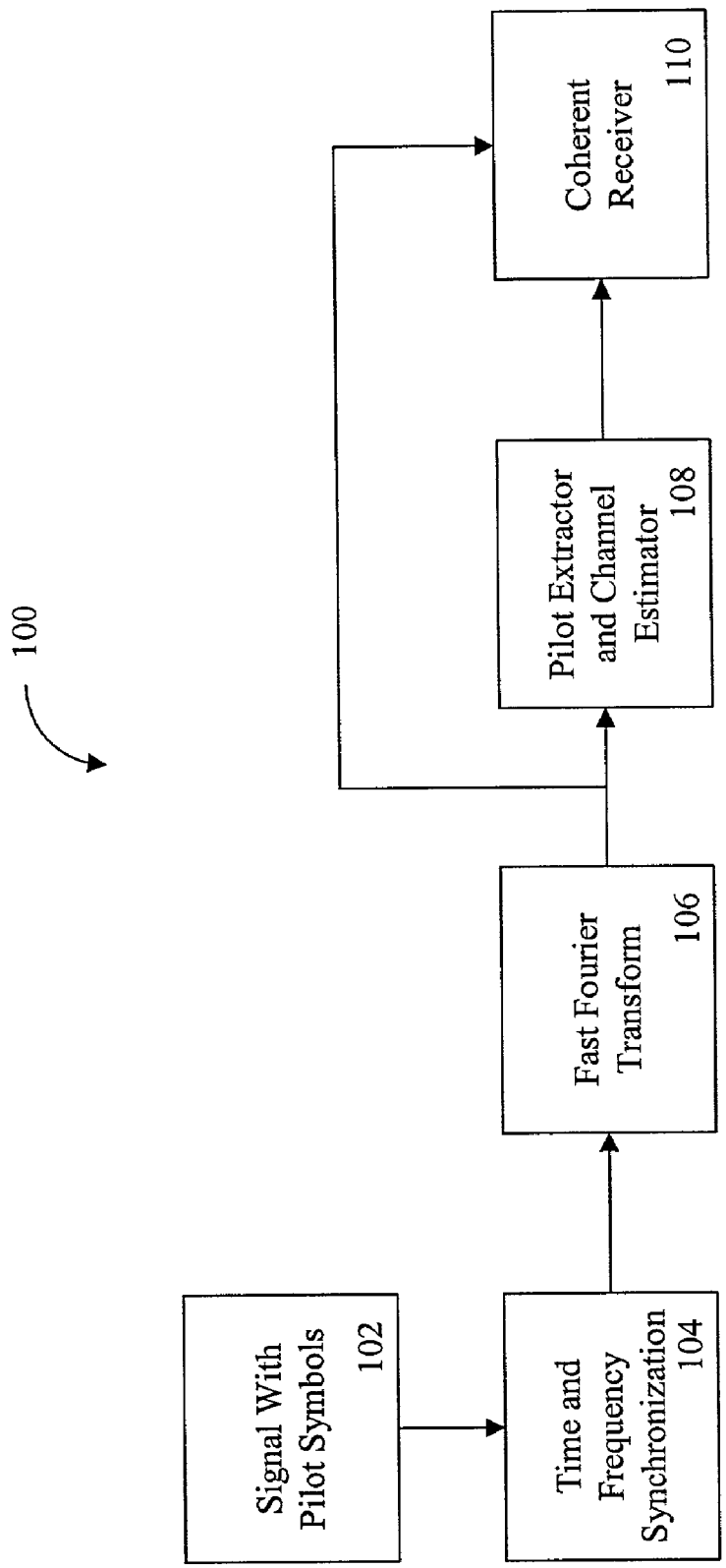
FIG. 1 is a block flow diagram of a prior art pilot assisted channel estimation OFDM system.
Figure 2:
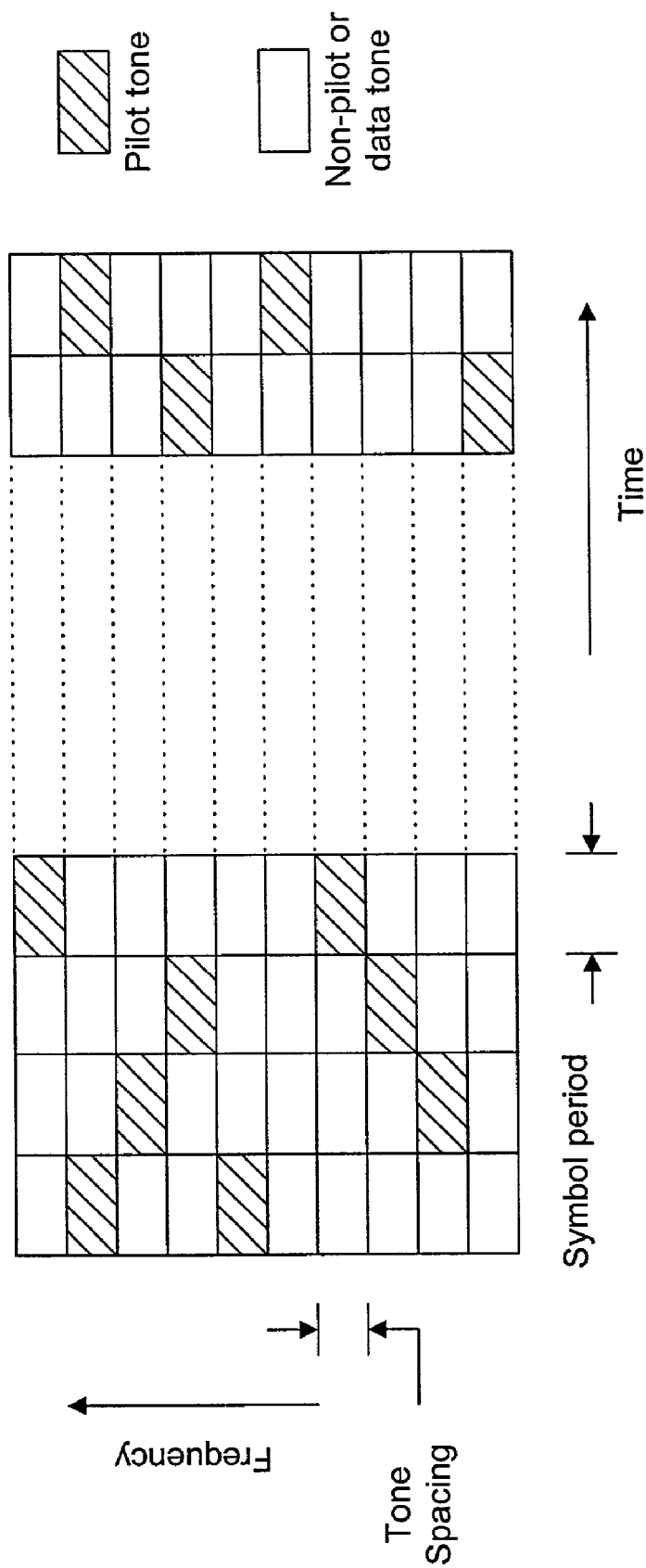
FIG. 2 is an illustration of a signal containing pilot points and non-pilot points.

FIG. 1 is a block flow diagram of a prior art pilot assisted channel estimation OFDM system 100. The prior art pilot assisted channel estimation OFDM system 100 starts with a signal containing pilot symbols 102. The signal 102 may be transmitted wirelessly, by wireline or by another transmission media. The signal 102 initially undergoes time and frequency synchronization 104 followed by a fast Fourier transform 106. The initial time and frequency synchronization 104 can be preformed by setting time and frequency parameters as a function of the signal 102. The synchronized and transformed signal is input in to the pilot extractor and channel estimator 108 and the coherent receiver 110. The pilot extractor and channel estimator 108 extracts the pilot symbols from the synchronized and transformed signal. The pilot symbols are arranged in a set of dedicated time and frequency points such that the receiver 110 can estimate the channel by some time and frequency interpolation from the pilot symbols as is known in the art. For example, FIG. 2 is an illustration of a signal containing pilot points and non-pilot points.

Figure 3:
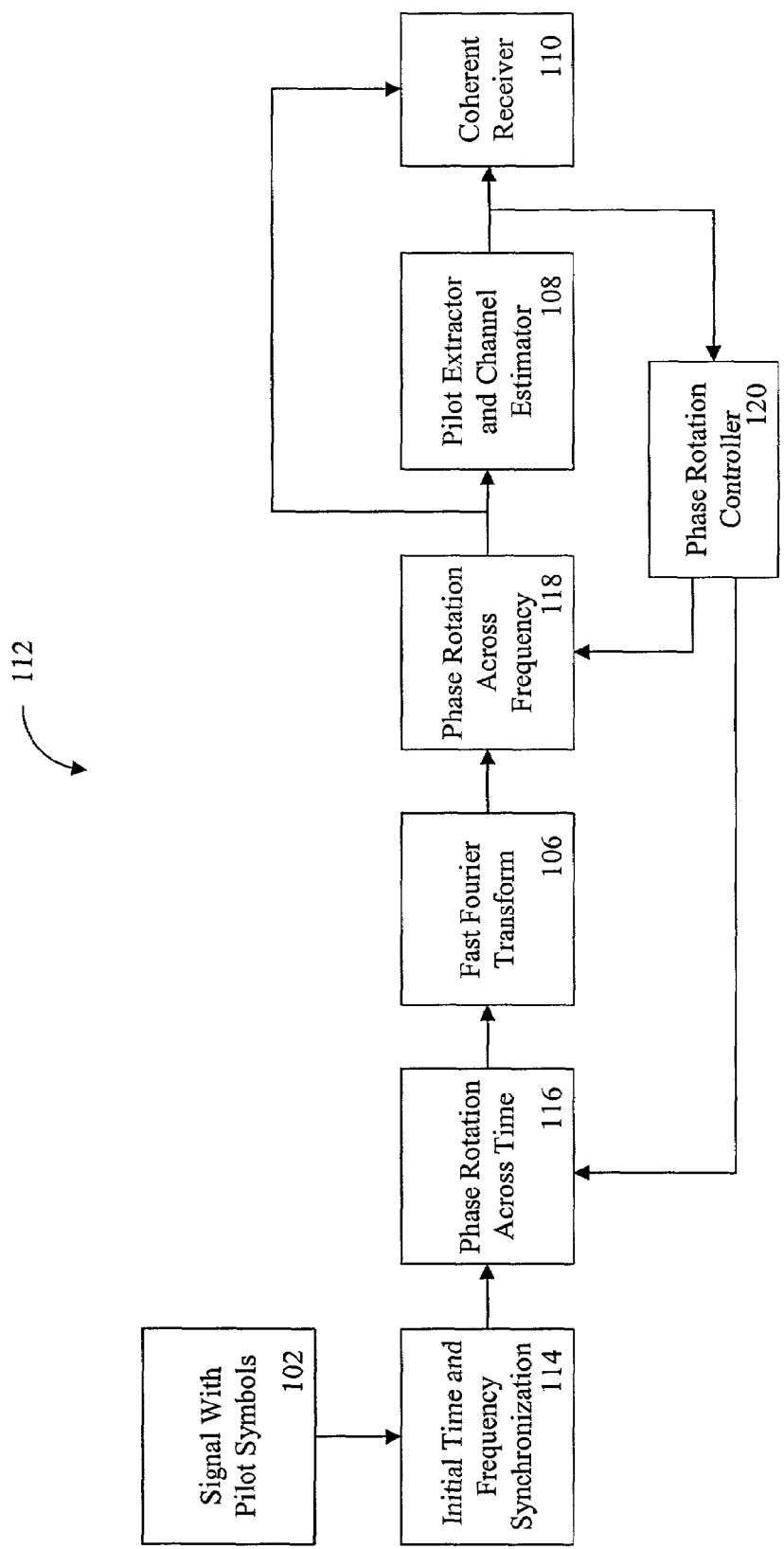
FIG. 3 is a block flow diagram of a pilot assisted channel estimation OFDM system according to the present invention.

FIG. 3 is a block flow diagram of a pilot assisted channel estimation OFDM system 112 according to the present invention. The system 112 starts with a signal containing pilot symbols 102 that are produced at intervals. The intervals can all be of equal or substantially similar duration since no intermittent pilot symbols are required. The signal 102 initially undergoes an initial time and frequency synchronization 114. The initial time and frequency synchronization 114 is a coarse synchronization that is determined according to a discreet optimization. The initial time and frequency synchronization 114 only needs to synchronize the signal 102 to the point where intercarrier interference effects and intersymbol interference effects may be neglected. For example, intersymbol interference will be negligible when the receiver symbol timing is synchronized so that all signal paths arrive within the receiver cyclic prefix. Initial synchronization may not be required to be very accurate due to the inherent uncertainty in the true channel parameters and the large amount of computation necessary to determine the initial time and frequency synchronization 114. Channel changes occurring over time can be tracked and accommodated with a simple stochastic gradient tracking loop that runs continuously.

The initially synchronized signal then has phase rotation across time imparted to the signal to compensate for a channel frequency offset. The signal then undergoes a fast Fourier transform 106 followed by a phase rotation across frequency to compensate for a channel time offset. The signal having been phase rotated across frequency is then coupled into the pilot extractor and channel estimator 108 and the coherent receiver 110. The Phase Rotation Across Time 116 and Phase Rotation Across Frequency 118 blocks fine tune the signal timing and frequency to minimize the estimated channel error.

The pilot extractor and channel estimator 108 extracts the pilot symbols from the signal. The pilot symbols are arranged in a set of dedicated time and frequency points such that the receiver 110 can estimate the channel by some time and frequency interpolation from the pilot symbols as is known in the art. A channel estimate $\hat{H}(t, n)$ is then output into the coherent receiver 110 and a phase rotation controller 120. The channel estimate $\hat{H}(t, n)$ can be defined as $$\hat{H}(t, n) = \sum_{s=1}^{S} p_s \hat{H}_0(t_s, n_s), \text{ where } \hat{H}_0(t, n) = Y(t, n)/U(t, n). \quad (1)$$

In equation (1), t is symbol period time, n is the tone frequency, S is the number of neighboring pilot points, $p_S$ are interpolation weights, U(t, n) are the transmitted symbols and Y(t, n) are received signals. The phase rotation controller 120 uses the channel estimate $\hat{H}(t, n)$ to control the amounts of phase rotation that are imparted to the signal.

Figure 4:
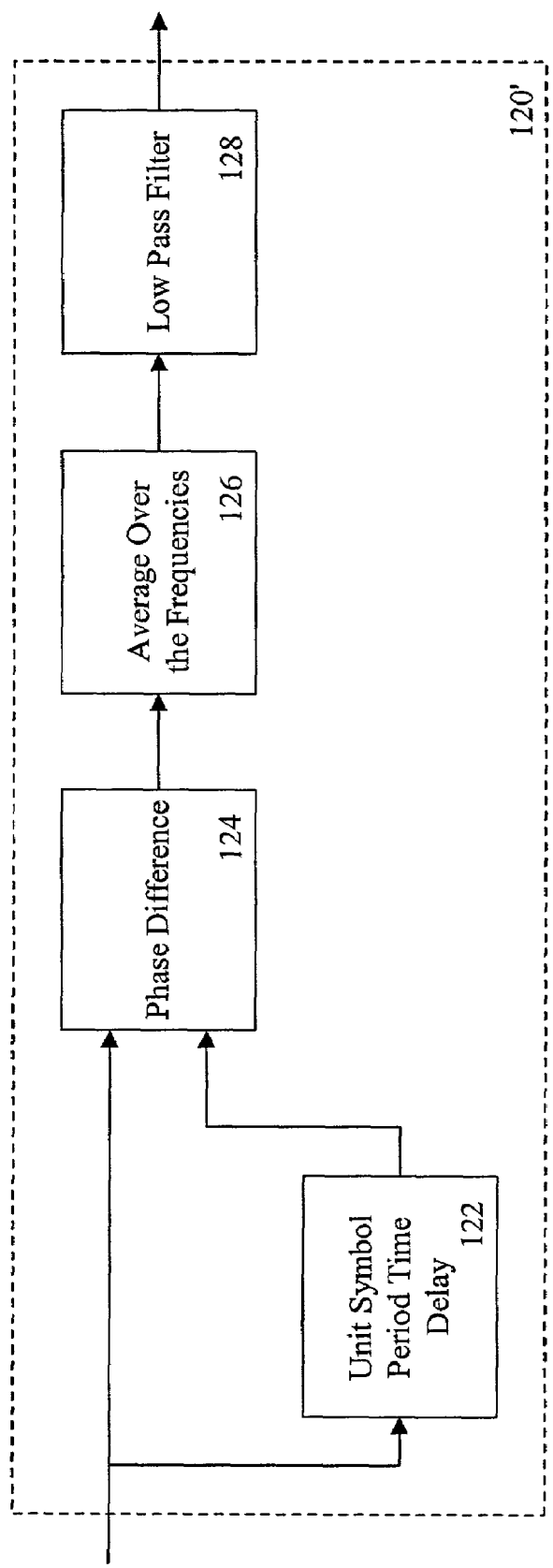
FIG. 4 is a block flow diagram of the components of the phase rotation controller of FIG. 3 which provide the output to the Phase Rotation Across Time block of FIG. 3.

FIG. 4 is a block flow diagram of the components of the phase rotation controller of FIG. 3 which provide the output to the Phase Rotation Across Time 116 block of FIG. 3. The channel estimate is coupled into the phase rotation controller 120 to determine the phase difference between the last channel estimate signal, i.e., the channel estimate at time=k and the present channel estimate signal, i.e., the channel estimate at time k+Δk. This can be achieved by coupling the channel estimate into a unit symbol period time delay 122 and then coupling the delayed channel estimate along with the undelayed channel estimate into an element that determines the phase difference 124. The phase difference 124 is then averaged over the frequencies 126, e.g., a running total of the phase differences divided by the number of frequencies in the running total, and filtered by a low pass filter 128. The output from the low pass filter 128 causes a phase rotation in the amount of $\theta_T$ to be introduced. The term r[k] denotes the signal input to the Phase Rotation Across Time 116 block, where k is time variable. The output of the Phase Rotation Across Time 116 block r1[k] is equal to r[k] multiplied by $\exp(-j2k\theta_T)$.

Figure 5:
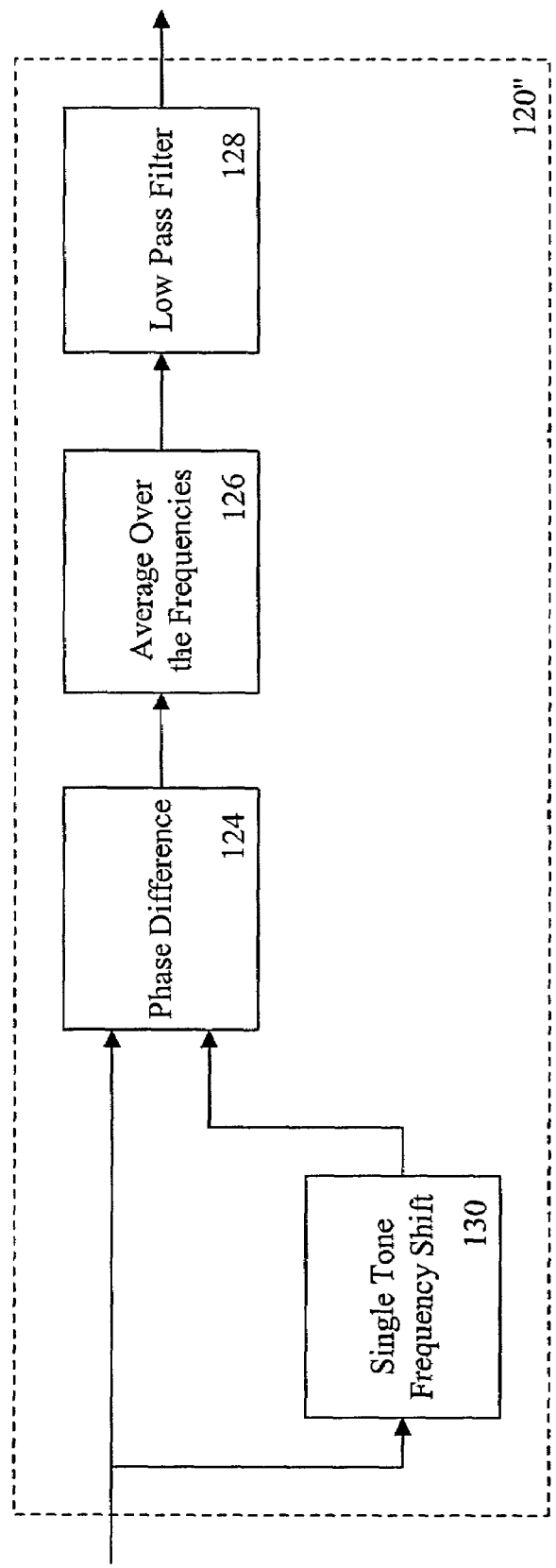
FIG. 5 is a block flow diagram of the components of the phase rotation controller of FIG. 3 which provide the output to the Phase Rotation Across Frequency block of FIG. 3.

FIG. 5 is a block flow diagram of the components of the phase rotation controller of FIG. 3 that provide the output to the Phase Rotation Across Frequency 118 block of FIG. 3. The channel estimate is coupled into the phase rotation controller 120 to determine the phase difference between adjacent frequency tones, or carrier frequencies, n and n+Δn, where n is the tone frequency and Δn is the frequency spacing between adjacent tones. This can be achieved by coupling the channel estimate into a single tone frequency shift 130 and then coupling the shifted channel estimate along with the unshifted channel estimate into an element that determines the phase difference 124. The phase difference 124 is then averaged over the frequencies 126 and filtered by a low pass filter 128. The output from the low pass filter 128 causes a phase rotation in the amount of $\theta_F$ to be introduced. The term R[n] denotes the signal input to the Phase Rotation Across Frequency 118 block, where n is frequency variable. The output of the Phase Rotation Across Frequency 118 block R1[n] is equal to R[n] multiplied by $\exp(-j2n\theta_F)$.

Figure 6:
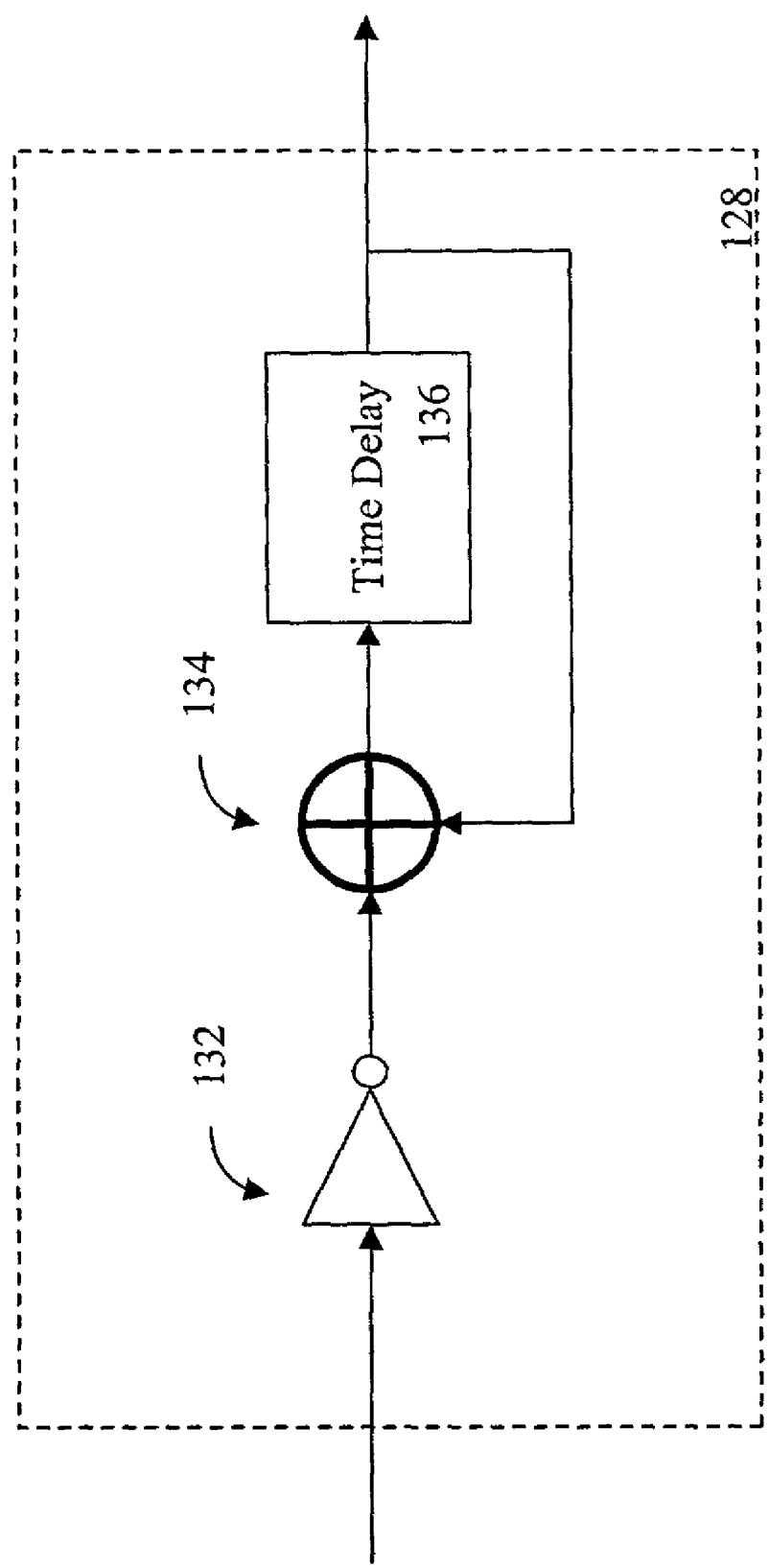
FIG. 6 is a block flow diagram of the components of an embodiment of the Low Pass Filter of FIGS. 3 and 4.

FIG. 6 is a block flow diagram of the components of an embodiment of the low pass filter 128 of FIGS. 3 and 4. The low pass filter 128 may be constructed with an inverting loop gain amplifier 132, an adder 134 and a time delay 136. The loop gain amplifier 132 inverts and scales an input signal for input into the adder 134. The output from the adder 134 is time delayed by the time delay element 136. The output of the time delay element 136 is the output of the low pass filter 128 and is provided as feedback into the adder 134. The low pass filter 128 may be constructed as shown in FIG. 6 or may be constructed from any other low pass filter.

The present invention may be applied to 2-way and multipath systems that operate in real time and may be implemented as software loaded into computers or other processors. The signals may include plural tones or carrier frequencies that each have an arrival timing offset and a frequency offset. The signals also have delay spread or Doppler spread. The channel estimation may be linear, quadratic or any other kind of estimation.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

We claim:

1. Apparatus for use in a pilot assisted channel estimation orthogonal frequency multiplexing system comprising:
    an initial time and frequency synchronizer for setting time and frequency parameters of the apparatus as a function of a received signal containing pilot symbols;
    a fast Fourier transformer;
    a pilot extractor and channel estimator;
    a controller that controls first and second phase rotators according to an output of the pilot extractor and channel estimator,
    wherein the first phase rotator phase rotates an output of the initial time and frequency synchronizer for output to the fast Fourier transformer; and
    wherein the second phase rotator phase rotates an output of the fast Fourier transformer for output to the pilot extractor and channel estimator and a receiver.

2. The apparatus of claim 1, wherein the time and frequency parameters are set such that intercarrier interference effects and intersymbol interference effects are negligible.

3. The apparatus of claim 1, wherein the received signal has plural carrier frequencies.

4. The apparatus of claim 1, wherein the setting of the parameters occurs in real time.

5. The apparatus of claim 1, wherein the initial time and frequency synchronizer uses discrete initial timing and frequency offsets.

6. The apparatus of claim 1, wherein:
    the controller measures a phase difference between the output of the pilot extractor and channel estimator at times k and k+Δk, where k is time and Δk is a symbol period; and
    the controller measures a phase difference between the output of the pilot extractor and channel estimator at frequencies n and n+Δn, where n is tone frequency and Δn is a frequency spacing between adjacent tones, wherein the controller controls the first phase rotator as a function of the phase difference between the output of the pilot extractor and the channel estimator at times k and k+Δk; and wherein the controller controls the second phase rotator as a function of the phase difference between the output of the pilot extractor and the channel estimator at frequencies n and n+Δn.

7. The apparatus of claim 1, wherein:

the first phase rotator phase rotates the output of the initial time and frequency synchronizer by $\exp(-j2k\theta_T)$, where k is time and $\theta_T$ is a first output from the controller; and the second phase rotator phase rotates the output of the fast Fourier transformer for output to the pilot extractor and channel estimator by $\exp(-j2n\theta_F)$, where n is the tone frequency and $\theta_F$ is a second output from the controller.

8. A method of synchronization for use in a pilot assisted channel estimation orthogonal frequency multiplexing system, the method comprising the steps of:

receiving a signal containing pilot symbols;

setting time and frequency parameters as a function of the signal so as to provide an initial time and frequency synchronization;

phase rotating the signal across time;

transforming the phase rotated signal with a fast Fourier transformation;

phase rotating the transformed signal across frequency; and extracting the pilot symbols and generating a channel estimate from the signal after the signal has been phase rotated across frequency, wherein the phase rotating across time and the phase rotating across frequency are controlled as a function of the channel estimate.

9. The method of claim 8, wherein the setting time and frequency parameters is done such that intercarrier interference effects and intersymbol interference effects are negligible.

10. The method of claim 8, wherein the signal containing pilot symbols has plural carrier frequencies.

11. The method of claim 10, wherein each of the plural carrier frequencies has an arrival timing offset and a frequency offset.

12. The method of claim 8, wherein the signal includes a time spread or Doppler spread.

13. The method of claim 8, wherein the setting time and frequency parameters occurs in real time.

14. The method of claim 8, wherein the initial time and frequency synchronization uses discrete initial timing and frequency offsets.

15. The method of claim 8, wherein:

a first measure being measured by a phase rotation controller and phase rotating the signal across time as a function of the first measure, the first measure being a phase difference between channel estimates at times k and k+Δk, where k is time and Δk is a symbol period;

a second measure being measured by the phase rotation controller and phase rotating the signal across frequency as a function of the second measure, the first second measure being a phase difference between channel estimates at frequencies n and n+Δn, where n is tone frequency and Δn is a frequency spacing between adjacent tones.

16. The method of claim 8, wherein:

the phase rotating the signal across frequency introduces $\exp(-j2n\theta_F)$ of rotation, where n is tone frequency and $\theta_F$ is a first control signal which is a function of the channel estimate; and the phase rotating the signal across time introduces $\exp(-j2k\theta_T)$, where k is time and $\theta_T$ is a second control signal which is a function of the channel estimate.

17. A pilot assisted channel estimation orthogonal frequency multiplexing system comprising:

initial synchronization means for initial time and frequency setting time and frequency parameters of the system as a function of a received signal containing pilot symbols;

fast Fourier transform means for fast Fourier transforming the received signal;

extracting and estimating means for extracting pilots and providing a channel estimate;

controlling means for controlling a first and second phase rotations according to the channel estimate, wherein the first phase rotation rotates an output of the initial synchronization means for output to the fast Fourier transform means; and the second phase rotation rotates an output of the fast Fourier transform means for output to the extracting and estimating means and a receiver means for receiving the received signal.

18. The system of claim 17, wherein initial synchronization means sets the time and frequency parameters such that intercarrier interference effects and intersymbol interference effects are negligible.

19. The system of claim 17, wherein the signal containing pilot symbols has a plurality of carrier frequencies.

20. The system of claim 17, wherein the setting time and frequency parameters occurs in real time.

21. The system of claim 17, wherein the initial synchronization means uses discrete initial timing and frequency offsets.

22. The system of claim 17, wherein:

the controlling means measures a phase difference between an output of the extracting and estimating means at times k and k+Δk, where k is time and Δk is a symbol period; and the controlling means measures a phase difference between the output of the extracting and estimating means at frequencies n and n+Δn, where n is tone frequency and Δn is a frequency spacing between adjacent tones.

23. The system of claim 17, wherein:

the first phase rotation is by $\exp(-j2k\theta_T)$, where k is time and $\theta_T$ is set by the controlling means; and the second phase rotation is by $\exp(-j2n\theta_F)$, where n is tone frequency and $\theta_F$ is set by the controlling means.

24. A computer program in a computer readable medium for causing a processor executing the program to synchronize the sub-components of a received signal to each other, the program comprising:

a module for initially synchronizing a signal containing pilot symbols so as to provide an initial time and frequency synchronization;

a module for phase rotating the signal across time;

a module for transforming the phase rotated signal with a fast Fourier transformation;

a module for phase rotating the transformed signal across frequency; and a module for extracting the pilot symbols and generating a channel estimate from the signal after the signal has been phase rotated across frequency, wherein the module for phase rotating across time and the module for phase rotating across frequency are responsive to the module for extracting the pilot symbols and generating the channel estimate.

25. The program of claim 24, wherein the initially synchronizing the signal containing pilot symbols so as to provide the initial time and frequency synchronization synchronizes the signal containing the pilot symbols such that intercarrier interference effects and intersymbol interference effects are negligible.

26. The program of claim 24, wherein the signal has plural carrier frequencies.

27. The program of claim 24, wherein the synchronizing of the sub-components of the received signal to each other, by the processor executing the program, occurs in real time.

28. The program of claim 24, wherein initial synchronization uses discrete initial timing and frequency offsets.

29. The program of claim 24, wherein:

the phase rotating across time is controlled as a function of a calculated phase difference between channel estimates at times k and k+Δk, where k is time and Δk is a symbol period; and the phase rotating across frequency is controlled as a function of a calculated phase difference between channel estimates at frequencies n and n+Δn, where n is tone frequency and Δn is a frequency spacing between adjacent tones.

30. The program of claim 24, wherein:

the phase rotating the signal across frequency rotates the signal by $\exp(-j2n\theta_F)$, where n is tone frequency and $\theta_F$ is set as a function of the channel estimate; and the phase rotating the signal across time rotates the signal by $\exp(-j2k\theta_T)$, where k is time and $\theta_T$ is set as a function of the channel estimate.

* * * * *

UNITED STATES PATENT AND TRADEMARK OFFICE
CERTIFICATE OF CORRECTION

| | |
|---|---|
| PATENT NO. | : 7,023,928 B2 |
| APPLICATION NO. | : 09/922885 |
| DATED | : April 4, 2006 |
| INVENTOR(S) | : R. Laroia et al. |

It is certified that error appears in the above-identified patent and that said Letters Patent is hereby corrected as shown below:

In the Claims:

Claim 7, column 5, line 16, delete "the".

Claim 15, column 5, line 63, delete "first".

Claim 17, column 6, line 19, delete "a".

Signed and Sealed this

Eleventh Day of July, 2006

JON W. DUDAS
*Director of the United States Patent and Trademark Office*